(12) United States Patent
Kim et al.

(10) Patent No.: US 11,576,119 B2
(45) Date of Patent: Feb. 7, 2023

(54) METHOD AND APPARATUS FOR POWER CONTROL FOR NETWORK ENERGY OPTIMIZATION

(71) Applicants: Samsung Electronics Co., Ltd., Suwon-si (KR); Seoul National University R&DB Foundation, Seoul (KR)

(72) Inventors: Youngjoon Kim, Suwon-si (KR); Hyungyu Ju, Seoul (KR); Byonghyo Shim, Seoul (KR); Hyojin Lee, Suwon-si (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 0 days.

(21) Appl. No.: 17/185,836

(22) Filed: Feb. 25, 2021

(65) Prior Publication Data
US 2021/0368437 A1 Nov. 25, 2021

(30) Foreign Application Priority Data
May 25, 2020 (KR) .................. 10-2020-0062499

(51) Int. Cl.
*H04W 52/02* (2009.01)
(52) U.S. Cl.
CPC ............. *H04W 52/0212* (2013.01)

(58) Field of Classification Search
CPC . H04W 52/0212; H04W 36/30; H04W 36/32; H04W 36/08; H04W 52/0216
See application file for complete search history.

(56) References Cited

U.S. PATENT DOCUMENTS

| | | | | |
|---|---|---|---|---|
| 7,969,912 B2* | 6/2011 | Jeon | ............ | H04L 12/403 370/254 |
| 8,050,215 B2* | 11/2011 | Kim | ............ | G06F 1/3203 455/574 |
| 8,638,705 B2* | 1/2014 | Park | ............ | H04W 48/08 455/343.1 |
| 10,200,958 B2* | 2/2019 | Kwak | ............ | H04W 52/36 |

(Continued)

FOREIGN PATENT DOCUMENTS

| | | | |
|---|---|---|---|
| KR | 10-1563865 B1 | 10/2015 | |
| KR | 10-2030128 B1 | 10/2019 | |

*Primary Examiner* — Rasheed Gidado

(57) ABSTRACT

The disclosure relates to a 5G communication system or a 6G communication system for supporting higher data rates beyond a 4G communication system such as long term evolution (LTE). The disclosure relates to a technique for controlling a base station power using an artificial intelligence based technology to improve an energy efficiency of a communication network. A method performed by a base station of a communication system according to an embodiment of the disclosure may include acquiring state information, determining an active/sleep request indicator (ASRI) based on at least a part of the state information, transmitting at least one of the state information and the ASRI to a central unit, receiving, from the central unit, power control information determined based on the at least one of the state information and the ASRI, and performing a power control based on the received power control information.

20 Claims, 9 Drawing Sheets

(56) References Cited

U.S. PATENT DOCUMENTS

| | | | |
|---|---|---|---|
| 2005/0105589 A1* | 5/2005 | Sung .................. | H04W 52/24 |
| | | | 375/130 |
| 2008/0220804 A1* | 9/2008 | Cho ................... | H04W 52/146 |
| | | | 455/522 |
| 2010/0119000 A1* | 5/2010 | Kim .................... | H04W 52/08 |
| | | | 375/260 |
| 2011/0103281 A1* | 5/2011 | Son .................... | H04W 76/28 |
| | | | 370/311 |
| 2016/0205606 A1* | 7/2016 | Park ................... | H04W 36/08 |
| | | | 455/436 |
| 2019/0268894 A1 | 8/2019 | Cho et al. | |

* cited by examiner

METHOD AND APPARATUS FOR POWER CONTROL FOR NETWORK ENERGY OPTIMIZATION

CROSS-REFERENCE TO RELATED APPLICATION

This application is based on and claims priority under 35 U.S.C. § 119 to Korean Patent Application No. 10-2020-0062499 filed on May 25, 2020 in the Korean Intellectual Property Office, the disclosure of which is herein incorporated by reference in its entirety.

BACKGROUND

1. Field

The disclosure provides a base station power control technique using technology based on artificial intelligence for improvement of energy efficiency of a communication network.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 sec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a predicting of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

As described above, in the 5G communication system and a 6G communication system in the near time, with the sudden increase of the numbers of smart phones and Internet of things (IoT) devices and data demands, an ultra-dense network, in which small base stations are arranged densely, has attracted attention as a means for improving the network capacity. The ultra-dense network has the advantage in that it can improve the network capacity as well as mitigating the burden of a macro base station, but has the problems in that an inter-cell interference becomes severe in the arrangement of the base stations due to intervals among the dense base stations, and the energy efficiency becomes degraded due to a large number of base stations having a low or almost no traffic load, so that technology to solve this is necessary.

SUMMARY

The disclosure provides a method for transitioning a base station having a low traffic load to an inactivation mode, that is, a sleep mode, to increase an energy efficiency in an ultra-dense network. Further, the disclosure provides a method for controlling a base station power, which can minimize power consumption of a network as well as satisfying a QoS of a terminal.

According to an embodiment of the disclosure to achieve the above objects, a method performed by a base station of a communication system may include: acquiring state information; determining an active/sleep request indicator (ASRI) based on at least a part of the state information; transmitting at least one of the state information and the ASRI to a central unit; receiving, from the central unit, power control information determined based on the at least one of the state information and the ASRI; and performing a power control based on the received power control information.

According to an embodiment, the state information may include at least one of channel state information with a terminal and a quality of service (QoS) indicator of the terminal.

According to an embodiment, the ASRI may indicate at least any one of active, sleep, and not decided.

According to an embodiment, in case that the ASRI indicates the active or the sleep, the power control information may be determined based on the ASRI.

According to an embodiment, in case that the ASRI indicates the not decided, the power control information may be determined based on the state information.

According to an embodiment of the disclosure, a method performed by a central unit of a communication system may include: receiving at least one of state information and an active/sleep request indicator (ASRI) from a base station; determining power control information on the base station based on at least any one of the state information and the ASRI received from the base station; and transmitting the power control information to the base station.

According to an embodiment of the disclosure, a base station of a communication system may include: a transceiver; and a controller configured to: acquire state information, determine an active/sleep request indicator (ASRI) based on at least a part of the state information, transmit at least one of the state information and the ASRI to a central unit, receive, from the central unit, power control information determined based on the at least one of the state information and the ASRI, and perform a power control based on the received power control information.

According to an embodiment of the disclosure, a central unit of a communication system may include: a transceiver; and a controller configured to: receive at least one of state information and an active/sleep request indicator (ASRI) from a base station, determine power control information on the base station based on at least any one of the state information and the ASRI received from the base station, and transmit the power control information to the base station.

According to the disclosure, the energy efficiency of the network can be maximized as well as the QoS of the terminal can be satisfied through the base station power control in the ultra-dense network environment in which the base station consumes a lot of power. Further, according to the disclosure, the calculation complexity of the apparatus for performing the power control can be greatly lowered using an artificial neural network, and the method for controlling the optimum base station power through the active/sleep mode request signal being transmitted by the base station can be provided.

Effects that can be obtained in the disclosure are not limited to the above-described effects, and other unmentioned effects can be clearly understood by those of ordinary skill in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
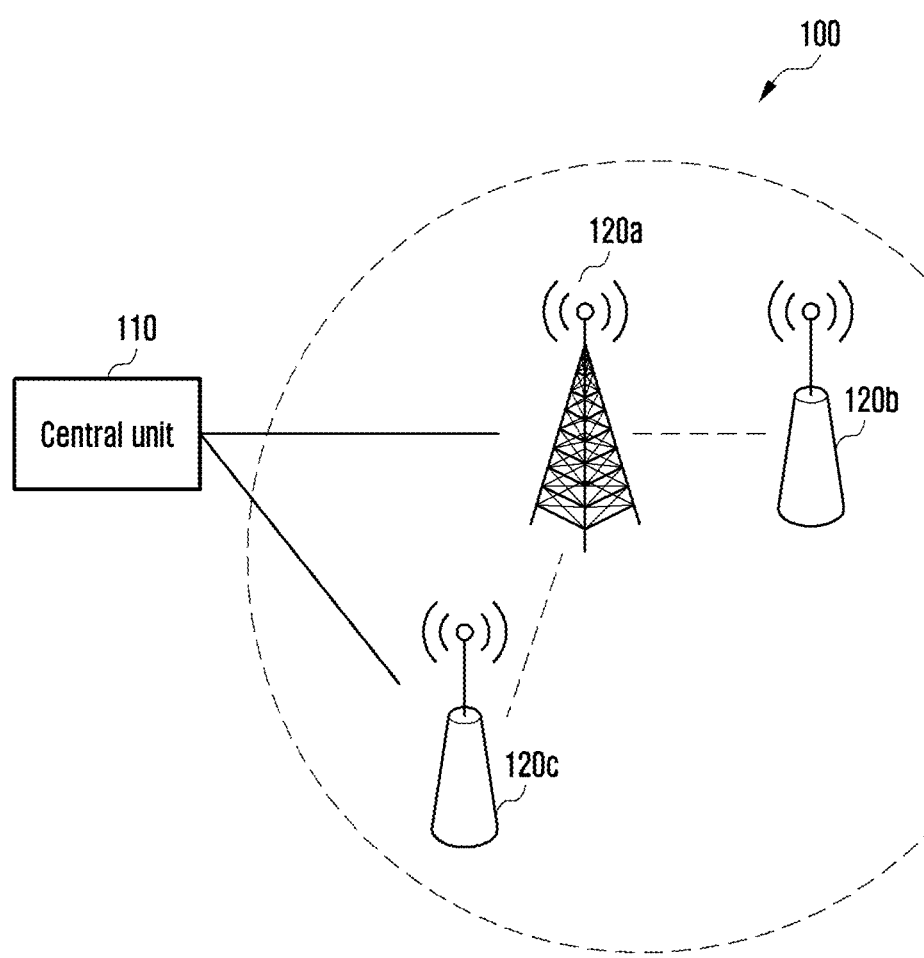
FIG. 1 is a diagram illustrating the structure of a communication network according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. Further, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

Further, in describing in detail embodiments of the disclosure, the main subject matter of the disclosure can also be applied even to other communication systems having similar technical backgrounds or channel types through slight modifications thereof within a range that does not greatly deviate from the scope of the disclosure by the judgment of those skilled in the art.

The advantages and features of the disclosure and methods for achieving the advantages and features will be apparent by referring to the embodiments to be described below in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means a software or hardware component, such as FPGA or ASIC, which performs certain tasks. However, "~unit" does not mean to be limited to software or hardware. The term "~unit" may be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more CPUs in a device or a security multimedia card.

Hereinafter, a term to refer to a signal used in the description, a term to refer to a channel, a term to refer to control information, a term to refer to network entities, a term to refer to a constituent element of a device, a term to identify an access node, a term to refer to messages, a term to refer to an interface between network entities, a term to refer to various types of identity information, and so on have been exemplified for convenience in explanation. Accordingly, the disclosure is not limited to the terms to be described later, and other terms to refer to targets having equivalent technical meanings may be used.

Recently, with the sudden increase of the numbers of smart phones and Internet of things (IoT) devices and data demands, an ultra-dense network, in which small base stations are arranged densely, has attracted attention as a means for improving the network capacity. The ultra-dense network has the advantage in that the ultra-dense network can improve the network capacity as well as mitigating the burden of a macro base station, but has the problems in that an inter-cell interference becomes severe due to intervals among the dense base stations, and the energy efficiency becomes degraded due to a large number of base stations having a low or almost no traffic load.

In the ultra-dense network, a technique to transition a base station having a low traffic load to an inactivation mode, that is, a sleep mode, may be used to increase an energy efficiency. The existing 4G LTE is configured centering around a macro base station taking charge of data channel and synchronization/control channel transmission, and thus there have been restrictions in applying a sleep mode transitioning technique thereto. However, in 5G NR and 6G mobile communications in the near time, since a plurality of small base stations are densely distributed around a macro base station and the coverage of the small base stations and the number of accessed terminals are not large, a sleep mode transitioning technique may be applied with respect to the small base stations having the low traffic load or having no accessed terminal. As the sleep mode technique in the related art, a heuristic technique and an optimization based technique exist. The heuristic technique applies the sleep mode technique in an ascending order of transmission power or traffic load of the base station. However, the heuristic technique has the drawback in that an energy efficiency is not good due to frequent mode transitions, the calculation complexity in the ultra-dense network is high, and an optimum base station combination is difficult to be found. The optimization based technique should solve the mixed integer programming that is an NP-difficulty problem in order to determine active/sleep mode of the base station. A solution can be obtained through an exhaustive search, but since the calculation complexity of the problem is exponentially increased according to the number of base stations in the network, time required for determination is lengthened, and due to this, it is realistically impossible to flexibly cope with the rapidly changing communication environment. The disclosure provides a technique to optimally control a base station power based on downlink channel state information between the base station and the terminal and a signal such as a QoS indicator of the terminal. By using machine learning, it is possible to effectively learn a complicated relationship between an input signal based on data and a power control to maximize the energy efficiency.

FIG. 1 is a diagram illustrating the structure of a communication network according to an embodiment of the disclosure.

Referring to FIG. 1, a communication network 100 according to an embodiment of the disclosure may be composed of a central unit 110 performing power control of respective base stations 120a, 120b, and 120c, and one or a plurality of base stations 120a, 120b, and 120c which operate in an active/sleep mode under the control of the central unit 110 and which transmit/receive signals to/from a terminal in the coverage.

The central unit 110 may be defined as a certain device provided with a function or a device for performing the power control of the plurality of base stations 120a, 120b, and 120c, and as an example, the central unit 110 may be implemented as a device existing independently of the base station as illustrated in FIG. 1 and may perform the power control of the plurality of base stations 120a, 120b, and 120c, or may be implemented in the macro base station 120a connected to the plurality of small base stations 120b and 120c although not illustrated in FIG. 1 and may perform the power control of the respective small base stations 120b and 120c. According to an embodiment, the small base station 120b may be connected to the central unit 110 through the macro base station 120a, or the small base station 120c may be directly connected to the central unit 110. The plurality of base stations 120a, 120b, and 120c may include the macro base station 120a connected to the plurality of small base stations or the small base stations 120b and 120c. Although FIG. 1 illustrates, for explanation, the communication network according to the disclosure including all of the macro base station 120a and the small base stations 120b and 120c connected thereto, the scope of the disclosure is not limited thereto, and the disclosure can be applied even to a communication network system including only a part thereof. Hereinafter, in the description, the power control performed by the central unit 110 may mean determination of an active/sleep mode with respect to the respective base stations 120a, 120b, and 120c being controlled by the central unit 110 or determination of a certain condition (e.g., the number of used antennas, a transmission power level, or the number of usable resource blocks) that can be used for the power control of the base station whose mode is determined as the active mode along with the determination of the active/sleep mode.

In the communication network illustrated in FIG. 1, a problem for the central unit 110 to maximize the energy efficiency of the network while satisfying predetermined conditions, such as the QoS of the respective terminals and power conditions of the base stations, through the power control may be composed of an optimization problem based on mathematical expressions. As an example, the optimization problem may be configured as a model for minimizing the power consumption of the network under conditions that the data transfer rate received by the respective terminals satisfies a data demand of the terminal. The power consumption of the base station may be composed of a total transmission power for the terminals connected to the respective base stations, a maintenance power being respectively consumed in the active/sleep mode, and a transition power necessary in case of the active/sleep mode transition. If it is assumed that indexes of the base station and the terminal are $m \in \{1, 2, \ldots, M\}$ and $k \in \{1, 2, \ldots, K\}$, respectively, the base station power consumption minimization problem for L time units (e.g., L seconds) may be expressed as in mathematical expression 1 as follows.

[Mathematical expression 1]
$$P_1 : \min_{\{a_m\}} \sum_{l=1}^{L} P_l^{total}$$

s.t. $R_k \geq R_{k,min}, \forall k = 1, 2, \ldots, K.$

Here, $\alpha_m \in \{0,1\}$ means a sleep(0) or active(1) mode of a base station m, and $R_{k,min}$ means a data transfer rate demand of a terminal k. $P_{total}^{(l)}$ is a total sum of power consumptions (e.g., transmission power, maintenance power, and transition power) of all base stations, and $R_k$ means a received data transfer rate of the terminal k and may be determined by channel information and transmission power between the base station and the terminal. As an example, in case of transmitting signals to the terminals connected to the base station, the base station may allocate constant powers to the terminals, and may apply $R_k = W \log_2(1 + SINR_k)$ that is the received data capacity to the terminals. Here, W means a frequency band of a signal, and $SINR_k$ means a signal-to-interference-plus-noise ratio. In case of transmitting data to the terminals connected to the base station, the SINR may be expressed as a function about channel information between the base station and the terminal.

The disclosure provides a power control method utilizing an artificial intelligence based technology. The artificial intelligence based technology applicable to achieve the technical subject provided in the disclosure may be certain artificial intelligence based technology including convolutional neural network (CNN), long-term short memory (LSTM), and deep reinforcement learning (DRL), and hereinafter, the disclosure discloses a method using deep reinforcement learning (DRL) as an example, but the scope of the disclosure is not limited thereto.

Figure 2:
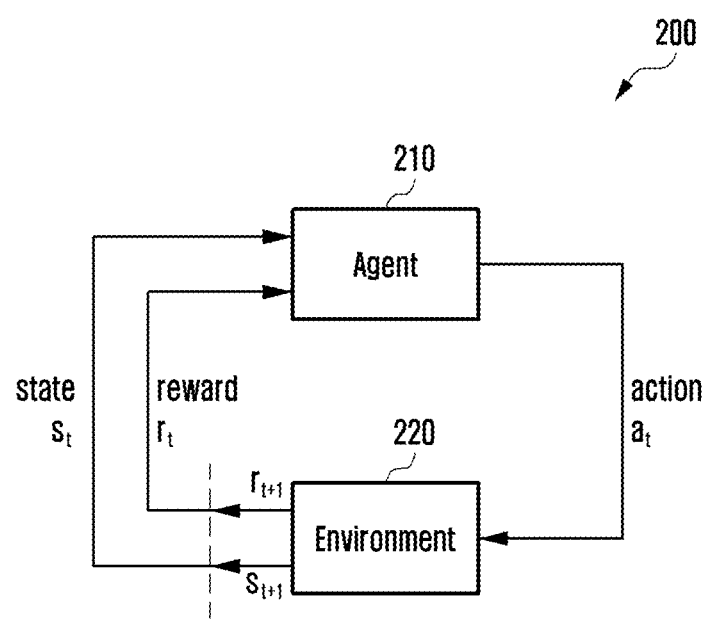
FIG. 2 is a diagram explaining deep reinforcement learning according to an embodiment of the disclosure.

FIG. 2 is a diagram explaining deep reinforcement learning according to an embodiment of the disclosure.

The deep reinforcement learning is an algorithm to search for the optimal policy for achieving the target based on trial and error, and when the current state $s_t \in S$ is given, an agent 210 may perform an action $a_t \in A$, and as the result of the action, the agent 210 may obtain a reward $r_t$ and a next state $s_{t+1} \in S$ through an environment 220. In this case, the optimal policy $\pi^*$ that maximizes an expected value of the cumulative reward may be expressed as in mathematical expression 2 as follows. Here, $\lambda$ is a discount factor ($0<\lambda<1$), which indicates a weight of a future reward against the current reward.

$$\pi^* = \underset{\pi}{\mathrm{argmax}} \mathbb{E}\left[\sum_{\tau=0}^{\infty} \lambda^t r_t \mid \pi\right] \quad \text{[Mathematical expression 2]}$$

The deep reinforcement learning may acquire the policy that maximizes the cumulative reward by training the deep neural network in the agent using the data (state, action, and reward) acquired in real time. For example, in case of Q-learning that is one of reinforcement learning algorithms, it is necessary to know Q-values of state-action pairs expressed as in mathematical expression 3 as indexes of action decision.

$$Q^\pi(s,a) = \mathbb{E}\left[\Sigma_{t=0}^{\infty} \lambda^t r_t \mid s_0 = s, a_0 = a\right] \quad \text{[Mathematical expression 3]}$$

In order to obtain the Q-values according to the mathematical expression 3, it is necessary to perform repeated update using the action and the reward acquired according to the action, and thus if the learning has a high calculation complexity and the task that may be performed has a high level of difficulty, it is very difficult to find the Q-values of all possible state-action pairs through the Q-learning. In order to solve this problem, a deep Q-network (DQN) capable of approximating the Q-values through grafting of the deep neural network is used. Parameters in the DQN may be learned in a direction in which a loss function L(w) of mathematical expression 4 below is minimized. In the mathematical expression, r(s,a) means the reward according to the given state and action, and s', a' indicate the next state and the next action, respectively.

$$L(w) = (r(s,a) + \lambda \max_{a' \in A} Q(s',a',w) - Q(s,a,w))^2 \quad \text{[Mathematical expression 4]}$$

In the disclosure, the state information that is used by the central unit to determine the power control (active/sleep mode) of the respective base stations at time unit t may be defined as the state $s_t$, and power control information that is generated based on this by the central unit, which determines the power control method (active/sleep mode) of the respective base stations may be defined as the action $a_t$.

According to an embodiment, the state information that is used by the central unit to determine the power control (active/sleep mode) of the respective base stations may include at least one of channel state information (CSI) between the base station and the terminal, quality of service (QoS) indicator of the terminal, user perceived throughput, remaining traffic amount of a base station queue, information on data satisfaction rate of each terminal up to the present and resource block scheduling of the terminal in the base station coverage, intensity of interference received from a neighbor base station, intensity of interference given to a neighbor base station, and traffic load. For example, the state information $s_t$ may include the channel state information between the base station and the terminal and the QoS indicator of the terminal, and may be expressed by the mathematical expression as follows.

$$s_t = [C_t Q_t]^T \quad \text{[Mathematical expression 5]}$$

$$C_t = \begin{bmatrix} CSI_{1,1}(t) & \cdots & CSI_{M,1}(t) \\ \vdots & \ddots & \vdots \\ CSI_{1,K}(t) & \cdots & CSI_{M,K}(t) \end{bmatrix},$$

$$Q_t = \begin{bmatrix} R^{(t)}_{1,min} \\ \vdots \\ R^{(t)}_{M,min} \end{bmatrix}$$

Although it is defined for convenience in explanation that the state information includes the CSI and the QoS indicator of the terminal, the disclosure is not limited thereto, and certain information included in the above-described state information may be defined as mathematical parameters through a method similar to $C_t$ and $Q_t$ and the state information $s_t$ may also be defined to correspond to this.

In an embodiment, the power control information for the respective base stations determined based on the state information, that is, the action $a_t$, may be defined to correspond to 1 in case that the respective base stations are determined to be in an active mode, and may be defined to correspond to 0 in case that the respective base stations are determined to be in a sleep mode. This may be expressed in the mathematical expression as follows.

$$a_t = [\alpha_1(t), \ldots, \alpha_M(t)], \alpha_m(t) \in \{0,1\} \quad \text{[Mathematical expression 6]}$$

In this case, the number of cases being considered to determine the action $a_t$, that is, the size of an action space A, may be $2^M$.

In an embodiment, the power control information, that is, the action $a_t$, may be determined in consideration of any one or a combination of the number A of antennas to be used by the base station set in the active mode in addition to the active/sleep mode determination, the number T of transmission power levels, and the number of allocated resource blocks B as additional variables, and the respective cases are expressed by a mathematical expression as follows.

$$a_t = [\alpha_1(t), \ldots, \alpha_M(t)], \alpha_m(t) \in \{0,1, \ldots, A\} \text{ for } m \in \text{active } BS$$

$$a_t = [\alpha_1(t), \ldots, \alpha_M(t)], \alpha_m(t) \in \{0,1, \ldots, T\} \text{ for } m \in \text{active } BS$$

$$a_t = [\alpha_1(t), \ldots, \alpha_M(t)], \alpha_m(t) \in \{0,1, \ldots, B\} \text{ for } m \in \text{active } BS \quad \text{[Mathematical expression 7]}$$

In the respective cases, if it is assumed that the number of base stations determined to be in the active mode is C, the number of cases being considered to determine a, that is, the sizes of the action spaces A may be $2^M \cdot A^C$, $2^M \cdot T^C$, and $2^M \cdot B^C$.

In an embodiment, the reward $r_t$ may be configured to have a larger value as the power consumption of the network becomes smaller as the result of performing an operation according to the action $\alpha_t$, and may be configured to impose a penalty in case that specific conditions (e.g., data requirement of the terminal and QoS) required by the base station and the terminal are not satisfied. One example thereof is expressed by a mathematical expression as follows.

[Mathematical expression 8]

$$r_t = \begin{cases} P_{max} - \sum_{m=1}^{M} P_m, \text{ in case of satisfying constraints} \\ -K, \text{ in case of dissatisfying constraints} \end{cases}$$

Here, $P_{max}$ indicates the maximum power that is used when the network makes all the base stations in the active mode, and $P_m$ indicates the power actually consumed by the base station m. According to the mathematical expression 8, $r_t$ has a larger value as the sum of powers actually consumed by the base stations constituting the network becomes smaller, and if specific constraints are not satisfied, a penalty of –K may be imposed. The mathematical expression 8 is an example for mathematically defining the reward, and may be defined as a certain form to induce the action for maximizing the energy efficiency while satisfying the specific constrains.

As described above, the power control method based on the deep reinforcement learning has been described. Meanwhile, in case of determining the power control (active/sleep mode) for the respective base stations based on the above-described method, the number of cases (size of the action space) to be considered as the number of base stations is increased is exponentially increased, and thus the calculation complexity is increased and the efficiency of learning may be degraded.

The disclosure refers to a method for reducing the size of the action space according to an embodiment, and provides a method in which the respective base stations determine by themselves and request, from the central unit, whether to operate in the active mode or the sleep mode in the next time unit, and the central unit determines the power control information on the respective base stations in consideration of this.

Figure 3:
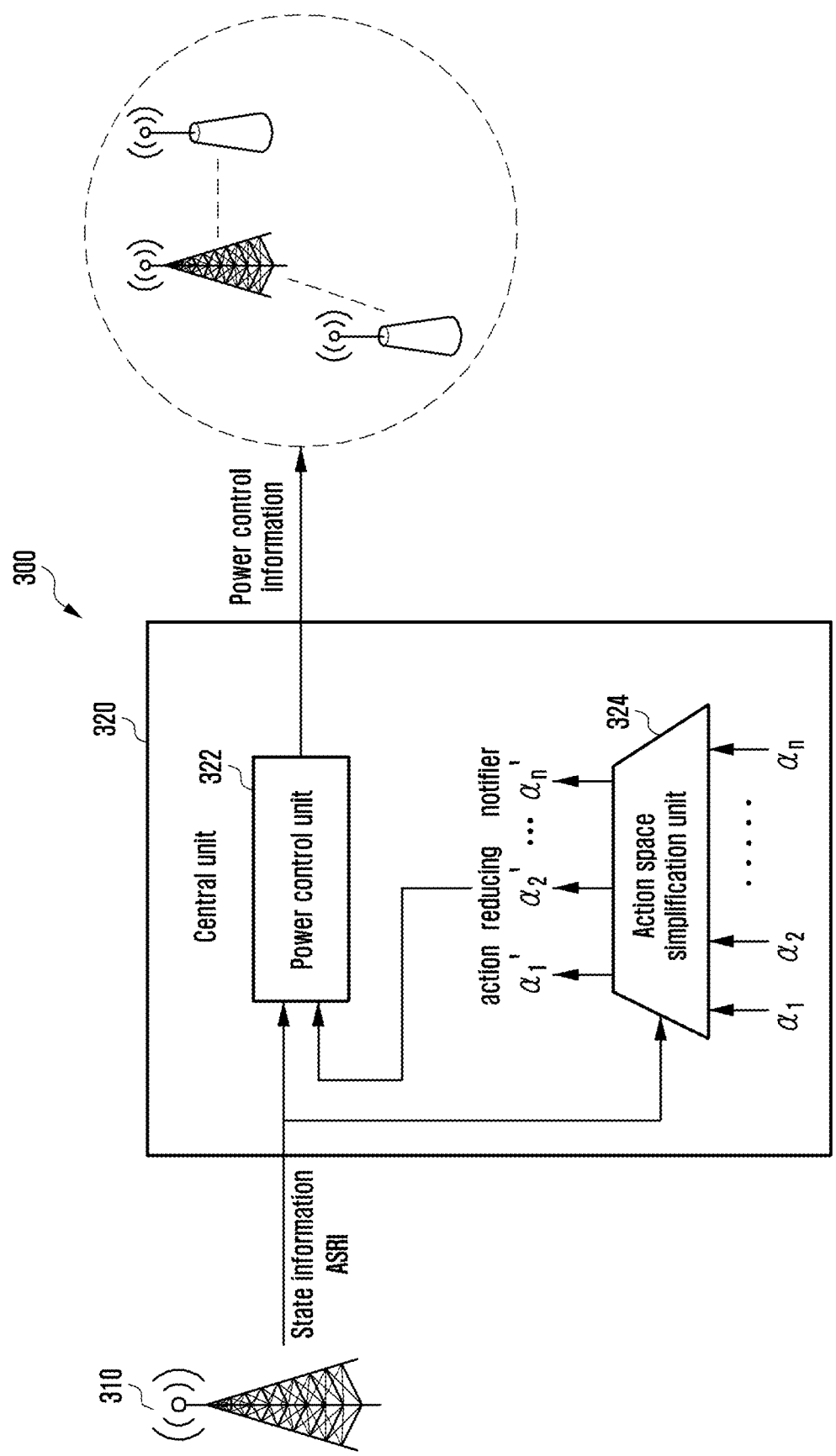
FIG. 3 is a diagram explaining a method for controlling a power in a communication network according to an embodiment of the disclosure.

FIG. 3 is a diagram explaining a method for controlling a power in a communication network according to an embodiment of the disclosure.

Referring to FIG. 3, a base station 310 may transmit, to a central unit 320, information for the central unit 320 to determine power control information on the base station 310. FIG. 3 shows that the base station 310 is directly connected to the central unit 320 and transmits the information thereto, and if the base station 310 corresponds to a small base station connected to the central unit 320 through a macro base station as described above with reference to FIG. 1, such state information may be transmitted to the central unit 320 through the macro base station. As described above, the information that the base station 310 transmits to the central unit 320 may include state information indicating states of the base station 310 and terminals included in the coverage of the base station 310, and an active/sleep request indicator (ASRI) determined by the base station 310. The information transmitted from the base station 310 to the central unit 320 may be transmitted through, for example, a backhaul network.

According to an embodiment, the state information may include at least one of channel state information (CSI) between the base station and the terminal, quality of service (QoS) indicator of the terminal, user perceived throughput, remaining traffic amount of a base station queue, information on a data satisfaction rate of each terminal up to the present and resource block scheduling of the terminal in the base station coverage, intensity of interference received from a neighbor base station, intensity of interference given to a neighbor base station, and traffic load. According to circumstances, the respective information included in the state information may be acquired through a certain method, that is, may be received from the terminal to the base station 310, may be acquired by the base station 310 by itself, or may be received from the macro base station or the central unit 320. For example, the state information may include the channel state information between the base station and the terminal and the QoS indicator of the terminal.

According to an embodiment, the active/sleep request indicator (ASRI) may be information which is generated by the base station 310 and which indicates any one of active, sleep, and not decided. According to an embodiment, the ASRI may be a signal which is generated based on the self-determination of the respective base stations 310 and is transmitted to the central unit 320, and which requests the active/sleep mode with respect to the base station 310 at the next time unit or at a specific time unit. In case that the base station 310 intends to request the central unit 320 to control the base station 310 to be in the active mode at the next time unit or at the specific time unit, the base station 310 may generate the ASRI indicating "active" and may transmit the generated ASRI to the central unit 320. Further, in case that the base station 310 intends to request the central unit 320 to control the base station 310 to be in sleep mode at the next time unit or at the specific time unit, the base station 310 may generate the ASRI indicating "sleep" and may transmit the generated ASRI to the central unit 320. Further, in case that it is difficult for the base station 310 to accurately determine the necessity of the active/sleep mode operation by itself, the base station 310 may generate the ASRI indicating "not decided" and may transmit the generated ASRI to the central unit 320.

In an embodiment, the base station 310 may generate the ASRI by determining the necessity of the active mode/sleep mode operation by itself based on at least a part of the state information. The state information may include at least any one of channel state information (CSI) between the base station and the terminal, quality of service (QoS) indicator of the terminal, user perceived throughput, remaining traffic amount of a base station queue, information on a data satisfaction rate of each terminal up to the present and resource block scheduling of the terminal in the base station coverage, intensity of interference received from a neighbor base station, intensity of interference given to a neighbor base station, and traffic load, and the base station 310 may generate the ASRI based on at least a part or the whole thereof. As an example, the base station 310 may generate the ASRI based on at least any one of the QoS indicator that is a signal and terminal scheduling related variable, user perceived throughput, a remaining traffic amount of the base station queue, and information on the data satisfaction rate of each terminal up to the present and resource block scheduling of the terminal in the small base station coverage.

In an embodiment, the respective base stations 310 may preemptively generate the ASRI and may periodically or aperiodically transmit the generated ASRI to the central unit 320. Further, the respective base stations 310 may periodically or aperiodically generate and transmit the ASRI according to the request from the central unit 320. Further, the respective base stations 310 may preemptively generate the ASRI and may periodically or aperiodically transmit the generated ASRI to the central unit 320, and even in case of the request from the central unit 320, the respective base stations 310 may periodically or aperiodically generate and transmit the ASRI.

If the base station 310 corresponds to a small base station connected to the macro base station and if it is currently determined that the terminals in the coverage of the base station 310 has a lot of data demand and a low satisfaction rate, and thus it is difficult to satisfy the QoS of the terminals only by the macro base station connected to the base station 310, the ASRI indicating "active" may be generated. In contrast, if it is determined that the terminals in the coverage of the base station 310 have a low data demand and a high satisfaction rate, and thus the QoS of the terminals in the coverage of the base station 310 can be satisfied only by the macro base station connected to the base station 310, the ASRI indicating "sleep" may be generated. Further, if the base station 310 is unable to accurately determine the active/sleep by itself, the "not decided" signal may be generated.

The central unit 320 may include a power control unit 322 generating power control information based on the state information, reward, and ASRI received from the base station 310, and an action space simplification unit 324. In an embodiment, the action space simplification unit 324 may perform the role of an action space simplifier for providing calculation complexity reduction and performance improvement through reduction of the size of the action space to be considered when the power control unit 322 generates the power control information.

The power control unit 322 may generate the power control information based on at least one of the state information, reward, and ASRI received from one or a plurality of base stations and information received from the action space simplification unit 324. The power control information may be information indicating the active/sleep mode with respect to the respective base stations 310, or information indicating any one or more of the number A of antennas, the number T of transmission power levels, and the number of allocated resource blocks B to be used with respect to the base station indicated to be in the active mode. As described above with reference to FIG. 2, the power control unit 322 may generate the power control information on the respective base stations by determining the action expecting the largest Q-value based on at least one of the state information, reward, and ASRI, and the information received from the action space simplification unit 324.

Meanwhile, in generating the power control information, the central unit 320 may reduce the action space based on the ASRI received from the base station 310. As an example, the central unit 320 may configure the action space composed of the base stations whose ASRI received from the base stations 310 indicates "not decided." In this case, "active" is indicated with respect to the base station whose ASRI determined and transmitted by the base station itself indicates "active," and "sleep" is indicated with respect to the base station whose ASRI determined and transmitted by the base station itself indicates "sleep." In this case, since it is not necessary to perform the calculation to determine the active/sleep mode based on the state information with respect to the above base stations, the central unit 320 may configure the action space only with the base stations having transmitted the ASRI indicating "not decided" eliminating the action space to be considered when the power control information is generated. That is, the central unit 320 may determine the power control information as active or sleep based on the ASRI with respect to the base station whose ASRI indicates "active" or "sleep," and may determine the power control information based on the state information according to the above-described method with respect to the base station whose ASRI indicates "not decided."

In addition, a deep neural network for action elimination may be introduced inside the action space simplification unit 324, and the action space can be reduced by identifying the base stations that can be additionally eliminated from the number of cases among the small base stations whose ASRI signal is "not decided" through reception of the CSI, QoS, ASRI signals as inputs. The power control unit 322 may maximize the efficiency of machine learning for generating the power control information using an action reducing notifier output by the action space simplification unit 324 as an input value. That is, the power control unit 322 in the central unit 320 receives an input of the CSI between the base station and the terminal, QoS indicator of the terminals, and the action reducing notifier, and determines an action expecting the largest Q-value, that is, the base station active/sleep mode, as the action. Since the number of cases of the Q-value to be predicted by the deep Q-network is considerably reduced using the ASRI and the action space simplifier, the calculation complexity can be reduced. Specifically, when the Q-network receives an input of the state and the specific action and predicts the Q-value of the corresponding state-action pair, the number of cases of the active/sleep mode determination to be considered can be greatly reduced using the action space simplification unit 324 in comparison to the case in which only the existing Q-network is used. This means improvement of the artificial neural learning speed inside the agent by preventing the active/sleep mode determination that is unable to satisfy the QoS requirements of the terminal and the reward therefor from being used as learning data of the DQN.

The central unit 320 may transmit, to the respective base stations, the power control information including the determined active/sleep mode information of the respective base stations or information corresponding to the respective base stations among the generated power control information. The respective base stations having received the power control information may transmit the reward according to the received power control information to the central unit 320 through the respective terminals and the base stations. As an example, the reward transmitted by the respective base stations may be determined based on whether to satisfy the constraints and the actual power consumption, and the reward may have a larger value as the power consumption becomes smaller as in the mathematical expression 8, whereas the reward may be configured to impose a penalty in case that the specific conditions (e.g., data requirement of the terminal and QoS) required by the base station and the terminal are not satisfied.

According to an embodiment, in case of receiving the mode determination result that is different from the self-determined ASRI signal, or in case of transmitting the active/sleep mode result that is unable to satisfy the QoS of the terminal, such as in case of transmitting the sleep mode result although the terminal to transmit the data exists, the respective base stations may transmit (−) reward value to the central unit. Further, the base stations may transmit a reward variable (e.g., power consumption of the base stations or ACK/NACK indicator) pre-agreed with the central unit 320 to the central unit 320. Thereafter, the central unit 320 may update the parameters of the artificial neural network after calculating the DQN loss function $L(w)=(r(s,a)+\lambda \max_{a' \in A} Q(s',a',w)-Q(s,a,w))^2$ disclosed through the mathematical expression 4 using the received reward variable values.

Figure 4:
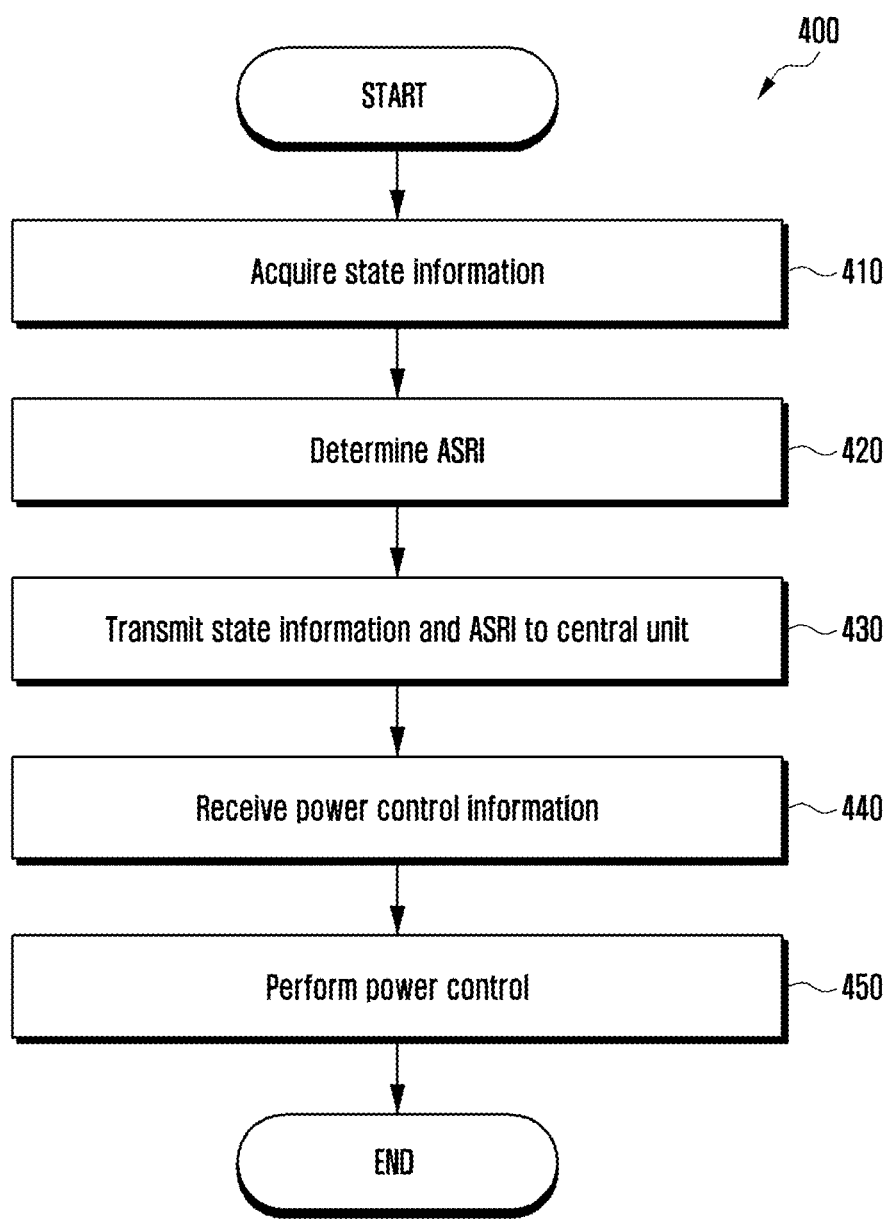
FIG. 4 is a flowchart illustrating an operation of a base station according to an embodiment of the disclosure.

FIG. 4 is a flowchart illustrating an operation of a base station according to an embodiment of the disclosure.

At operation 410, the base station may acquire state information to be used for ASRI determination or to be transmitted to a central unit. The state information may include at least one of channel state information (CSI) between the base station and the terminal, quality of service (QoS) indicator of the terminal, user perceived throughput, remaining traffic amount of a base station queue, information on a data satisfaction rate of each terminal up to the present and resource block scheduling of the terminal in the base station coverage, intensity of interference received from a neighbor base station, intensity of interference given to a neighbor base station, and traffic load. According to circumstances, the respective information included in the state information may be acquired through a certain method, that is, may be received from the terminal to the base station 310, may be acquired by the base station 310 by itself, or may be received from the macro base station or the central unit 320. As an example, the base station may receive the channel state information and a QoS indicator of the terminal from the terminal, and may receive a data satisfaction rate of the terminal and resource block scheduling information for the terminal inside the base station coverage from a macro base station or the central unit, and the base station itself may acquire information such as a remaining traffic amount of the base station queue. This is merely an example for acquiring the state information, and the disclosure is not limited thereto.

At operation 420, the base station may generate the ASRI by determining the necessity of the active mode/sleep mode operation by itself based on at least a part of the state information. The state information may include at least any one of channel state information (CSI) between the base station and the terminal, quality of service (QoS) indicator of the terminal, user perceived throughput, remaining traffic amount of a base station queue, information on a data satisfaction rate of each terminal up to the present and resource block scheduling of the terminal in the base station coverage, intensity of interference received from a neighbor base station, intensity of interference given to a neighbor base station, and traffic load, and the base station may generate the ASRI based on at least a part or the whole thereof. As an example, the base station may generate the ASRI based on at least any one of the QoS indicator that is a signal and terminal scheduling related variable, user perceived throughput, a remaining traffic amount of the base station queue, and information on the data satisfaction rate of each terminal up to the present and resource block scheduling of the terminal in the coverage of the small base station.

At operation 430, the base station may transmit the previously acquired state information and ASRI to the central unit. In an embodiment, the base station may transmit the state information and the ASRI to the central unit through a backhaul network.

At operation 440, the base station may receive, from the central unit, the power control information (or information corresponding to the corresponding base station among the power control information) determined by the central unit based on the state information and the ASRI. The power control information may be information indicating the active/sleep mode with respect to the respective base stations 310, or information indicating any one or more of the number A of antennas, the number T of transmission power levels, and the number of allocated resource blocks B to be used with respect to the base station indicated to be in the active mode.

At operation 450, the base station may perform the power control based on the power control information received from the central unit.

Although not illustrated, in accordance with the power control performing result based on the power control information received from the central unit, the base station may transmit the reward generated based on the requirement satisfaction and the actual power consumption to the central unit. As shown in the mathematical expression 8, the reward may be configured to have a larger value as the power consumption becomes smaller, and may be configured to impose a penalty in case that specific conditions (e.g., data requirement of the terminal and QoS) required by the base station and the terminal are not satisfied.

Figure 5:
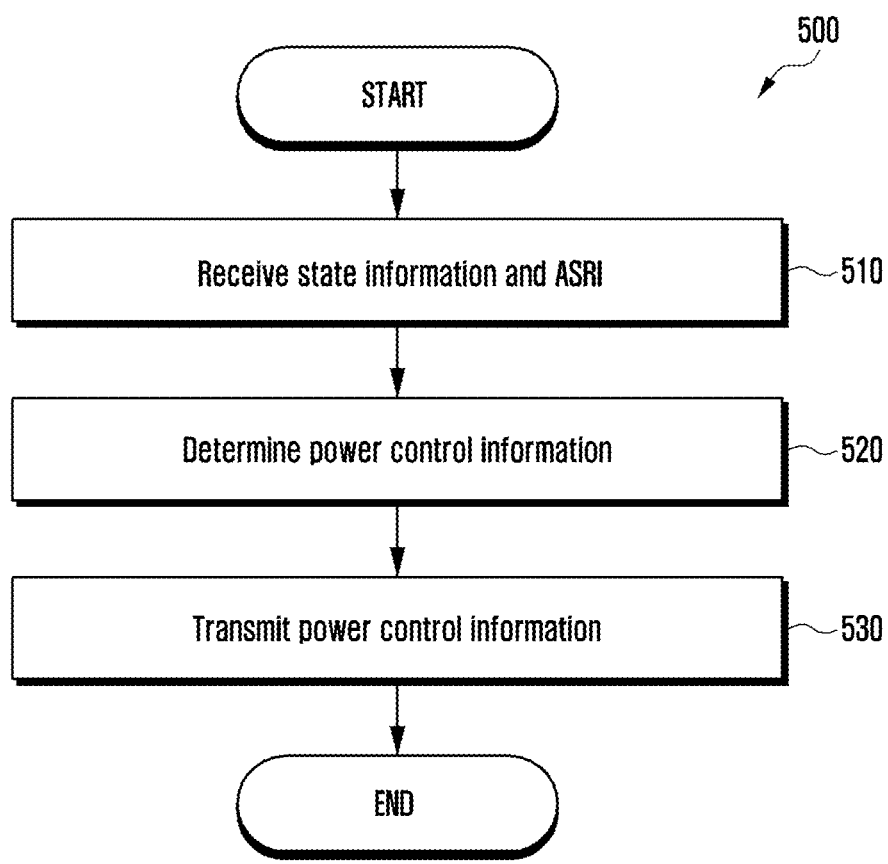
FIG. 5 is a flowchart illustrating an operation of a central unit according to an embodiment of the disclosure.

FIG. 5 is a flowchart illustrating an operation of a central unit according to an embodiment of the disclosure.

At operation 510, the central unit may receive the state information and the ASRI from the base station.

At operation 520, the central unit may generate the power control information based on the state information and the ASRI received from the base station. In an embodiment, the central unit may generate the power control information based on at least one of the state information, the ASRI, and an action reducing notifier generated by the action space simplification unit 324. The power control information may be information indicating the active/sleep mode with respect to the respective base stations, or information indicating any one or more of the number A of antennas, the number T of transmission power levels, and the number of allocated resource blocks B to be used with respect to the base station indicated to be in the active mode. The central unit may generate the power control information on the respective base stations by determining an action expecting the largest Q-value based on at least one of the state information, the ASRI, and the action reducing notifier generated by the action space simplification unit. As an example, if the ASRI received from the base station indicates "active" or "sleep," the central unit may determine the power control information corresponding to the corresponding base station as active or sleep based on the ASRI. Further, if the ASRI received from the base station is "not decided," the base station may be included in the action space that is considered to determine the power control information based on the state information, and may be determined based on the state information received from the base station. Meanwhile, although not illustrated, the central unit may generate the power control information more based on the reward according to the power control result of the respective base stations performed at the previous time unit.

At operation 530, the central unit may transmit the generated power control information or information corresponding to the respective base stations among the power control information to the respective base stations.

Figure 6:
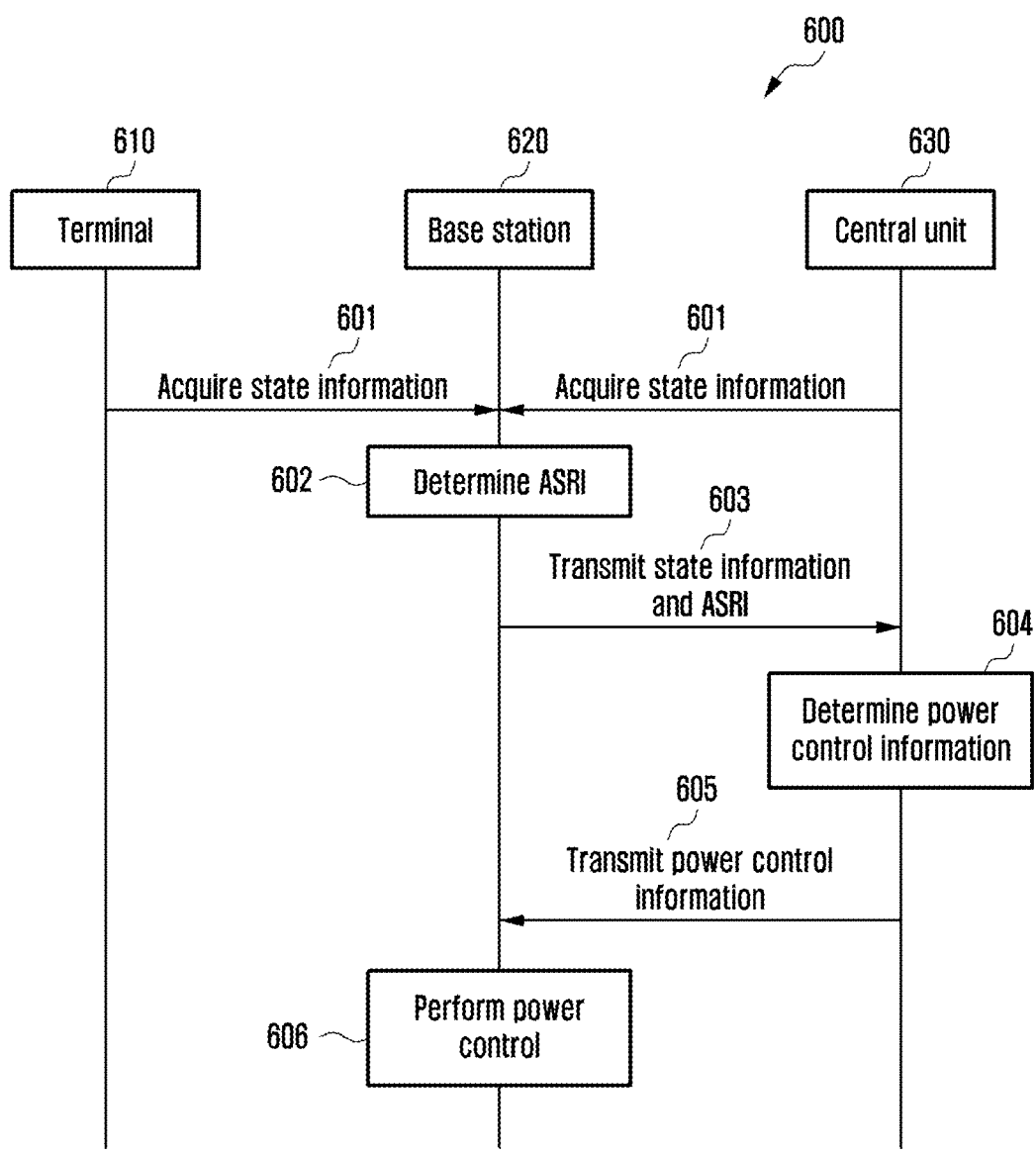
FIG. 6 is a flowchart illustrating a method for controlling a power in a communication network according to an embodiment of the disclosure.

FIG. 6 is a flowchart illustrating a method for controlling a power in a communication network according to an embodiment of the disclosure.

Specifically, FIG. 6 is a flowchart illustrating a method for controlling the power in case that a base station 620 is directly connected to a central unit 630. In this case, the base station 620 may be a macro base station or a small base station directly connected to the central unit. Referring to FIG. 6, the base station 620 may acquire state information from a terminal 610 or the central unit 630 (601). Although FIG. 6 illustrates that the base station acquires the state information from both the terminal and the central unit, the base station may acquire the state information from any one of the terminal 610 or the central unit 630 according to the configuration of the base station or the kind of information intended to be acquired. Further, although not illustrated, the state information may include not only information acquired from the terminal 610 or the central unit 630 but also information acquired by the base station 620 itself. The base station 620 may determine an ASRI by determining whether to request the central unit 630 to make the base station 620 operate in the active mode or whether to request the central unit 630 to make the base station 620 operate in the sleep mode based on the acquired state information (602). If it is difficult for the base station 620 to determine whether to request the active mode operation or the sleep mode operation by itself, the base station 620 may determine that the ASRI indicates "not decided." After the ASRI determination, the base station 620 may transmit the acquired state information and the determined ASRI to the central unit 630 (603). The central unit 630 may determine the power control information based on the state information and the ASRI received from one or a plurality of base stations (604). The central unit 630 may transmit the determined power control information or information corresponding to the base station 620 among the power control information to the base station 620 (605), and the base station 620 having received this may perform the power control based on the received power control information (607). Further, although not illustrated, the base station 620 may determine the reward to be transmitted to the central unit 630 according to the result of performing the power control based on the received power control information and may transmit the determined reward to the central unit 630. The central unit 630 may determine the power control information more based on the reward in addition to the state information and the ASRI.

Figure 7:
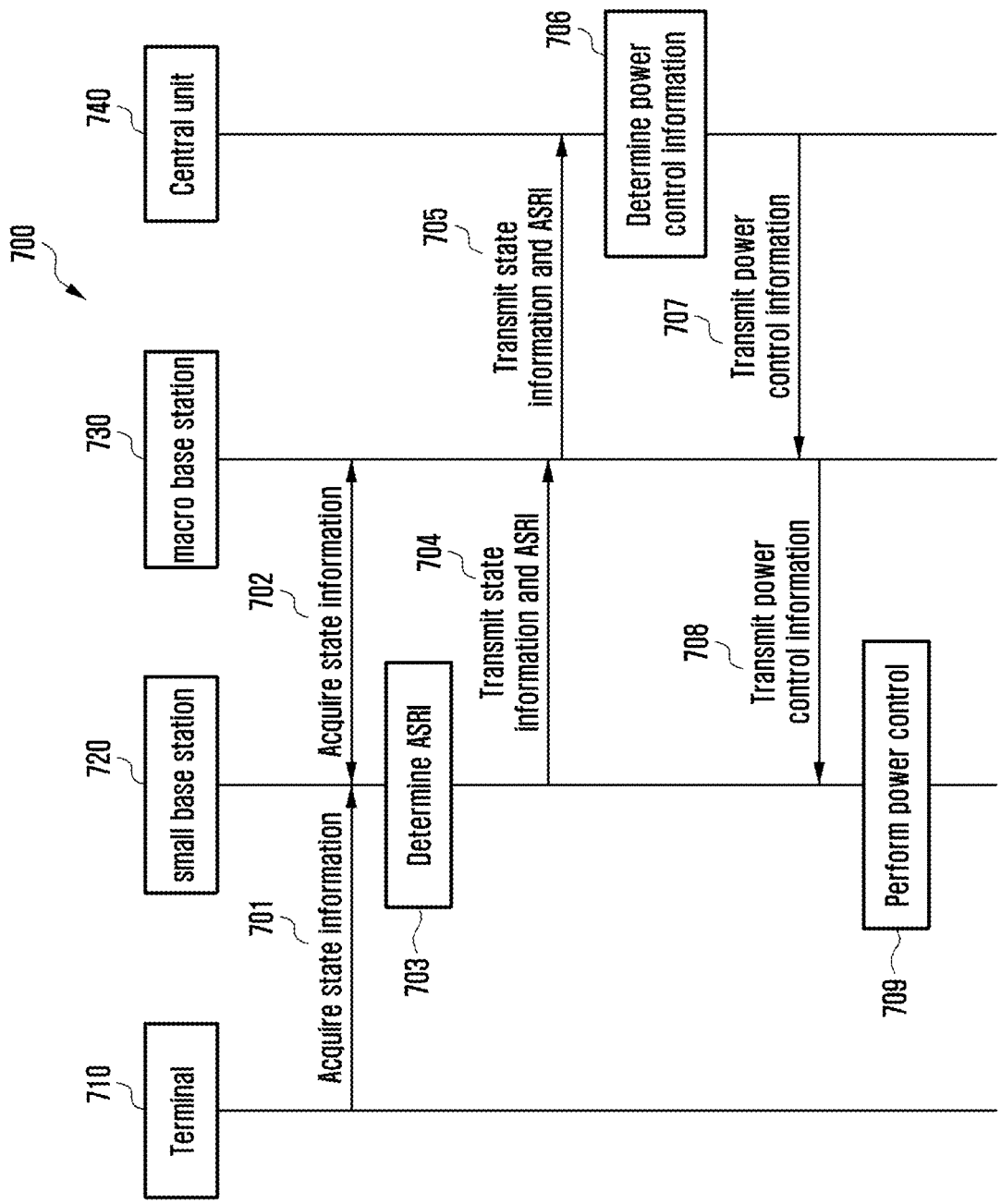
FIG. 7 is a flowchart illustrating a method for controlling a power in a communication network according to another embodiment of the disclosure.

FIG. 7 is a flowchart illustrating a method for controlling a power in a communication network according to another embodiment of the disclosure.

Specifically, FIG. 7 is a flowchart illustrating a method for controlling the power in case that a base station that is a power control target is connected to a central unit through a macro base station, and corresponds to a small base station 720 controlled by the macro base station. Referring to FIG. 7, the small base station 720 may acquire state information from a terminal 710 (701). Further, the small base station 720 may acquire the state information from a macro base station 730 (702). In an embodiment, at least a part of the state information acquired from the macro base station 730 may be information determined by the small base station 720 based on at least a part of the state information acquired from the terminal 710. The small base station 720 may determine an ASRI by determining whether to request a central unit 740 to make the small base station 720 operate in the active mode or whether to request the central unit 740 to make the small base station 720 operate in the sleep mode based on the acquired state information (703). If it is difficult for the small base station 720 to determine whether to request the active mode operation or the sleep mode operation by itself, the small base station 720 may determine that the ASRI indicates "not decided." After the ASRI determination, the small base station 720 may transmit the acquired state information and the determined ASRI to the macro base station 730 (704). The macro base station 730 may transmit the state information and the ASRI acquired from the small base station 720 to the central unit 740 (705).

The central unit 740 may determine the power control information based on the state information and the ASRI received from one or a plurality of base stations (706). The central unit 740 may transmit the determined power control information or information corresponding to the small base station 720 controlled by the macro base station 730 among the power control information to the macro base station 730 (707), and the macro base station 730 may transmit the information to the small base station 720 again (708). The small base station 720 having received the information may perform the power control based on the received power control information (709).

Figure 8:
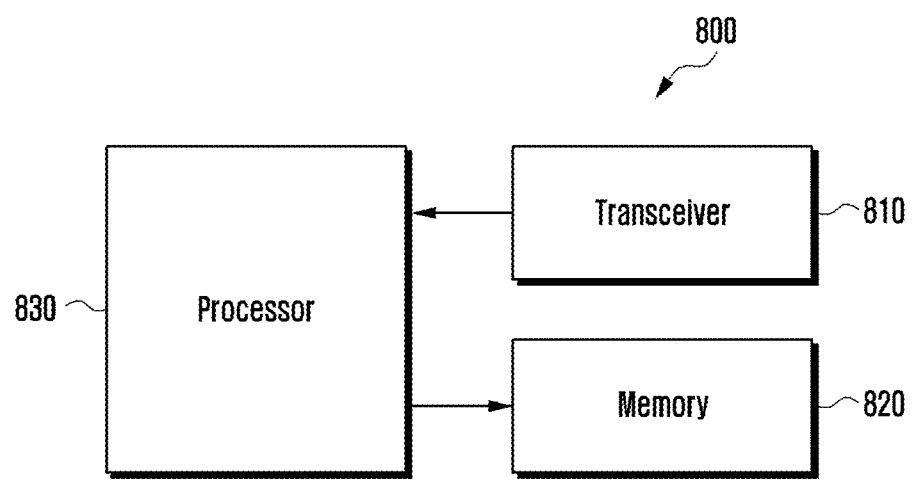
FIG. 8 is a diagram illustrating the configuration of a base station according to an embodiment of the disclosure.

FIG. 8 is a diagram illustrating the configuration of a base station according to an embodiment of the disclosure.

Referring to FIG. 8, a base station may include a transceiver 810, a memory 820, and a processor 830. In accordance with the above-described embodiment, the transceiver 810, the memory 820, and the processor 830 of the base station may operate. However, the constituent elements of the base station are not limited to the above-described example. For example, the base station may include more constituent elements than the above-described constituent elements, or may include less constituent elements. Further, the transceiver 810, the memory 820, and the processor 830 may be implemented in the form of one chip.

The transceiver 810 may transmit and receive a signal with other constituent elements, such as a terminal, and other base station and central unit, in the communication network. Here, the signal may include control information and data. For this, the transceiver 810 may be composed of an RF transmitter up-converting and amplifying the frequency of the transmitted signal and an RF receiver low-noise-amplifying the received signal and down-converting the frequency of the signal. However, this is merely one embodiment of the transceiver 810, and the constituent elements of the transceiver 810 are not limited to the RF transmitter and the RF receiver.

Further, the transceiver 810 may receive the signal on a radio channel, output the received signal to the processor 830, and transmit the signal output from the processor 830 on the radio channel.

The memory 820 may store therein programs and data necessary for the operation of the base station. Further, the memory 820 may store control information or data included in the signal transmitted or received by the base station. The memory 820 may be composed of storage media, such as ROM, RAM, hard disk, CD-ROM, and DVD, and a combination of the storage media. Further, a plurality of memories 820 may be provided.

Further, the processor 830 may control a series of processes so that the base station can operate according to the above-described embodiment. For example, according to the above-described embodiment, the processor 830 may acquire the state information, determine the ASRI, and control the operation of the base station so as to control the power according to the received power control information. A plurality of processors 830 may be provided, and the processor 830 may control the constituent elements of the base station by executing the program stored in the memory 820.

Figure 9:
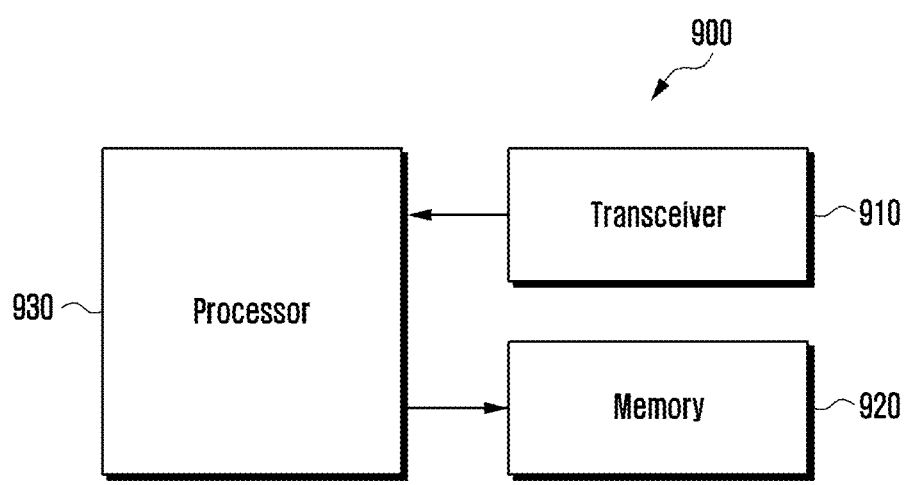
FIG. 9 is a diagram illustrating the configuration of a central unit according to an embodiment of the disclosure.

FIG. 9 is a diagram illustrating the configuration of a central unit according to an embodiment of the disclosure.

Referring to FIG. 9, a central unit may include a transceiver 910, a memory 920, and a processor 930. In accordance with the above-described embodiment, the transceiver 910, the memory 920, and the processor 930 of the central unit may operate. However, the constituent elements of the central unit are not limited to the above-described example. For example, the central unit may include more constituent elements than the above-described constituent elements, or may include less constituent elements. Further, the transceiver 910, the memory 920, and the processor 930 may be implemented in the form of one chip.

The transceiver 910 may transmit and receive a signal with other constituent elements, such as a terminal and a base station, in the communication network. Here, the signal may include control information and data. For this, the transceiver 910 may be composed of an RF transmitter up-converting and amplifying the frequency of the transmitted signal and an RF receiver low-noise-amplifying the received signal and down-converting the frequency of the signal. However, this is merely one embodiment of the transceiver 910, and the constituent elements of the transceiver 910 are not limited to the RF transmitter and the RF receiver.

Further, the transceiver 910 may receive the signal on a radio channel, output the received signal to the processor 930, and transmit the signal output from the processor 930 on the radio channel.

The memory 920 may store therein programs and data necessary for the operation of the central unit. Further, the memory 920 may store control information or data included in the signal transmitted or received by the central unit. The memory 920 may be composed of storage media, such as ROM, RAM, hard disk, CD-ROM, and DVD, and a combination of the storage media. Further, a plurality of memories 920 may be provided.

Further, the processor 930 may control a series of processes so that the central unit can operate according to the above-described embodiment. For example, according to the above-described embodiment, the processor 930 may acquire the state information, determine the ASRI, and control the operation of the central unit so as to control the power according to the received power control information. A plurality of processors 930 may be provided, and the processor 930 may control the constituent elements of the central unit by executing the program stored in the memory 920. Further, the processor 930 may be configured to include the power control unit 322 and the action space simplification unit 324 as described above.

The methods according to claims of the disclosure and embodiments described in the description may be implemented in the form of hardware, software, or a combination of hardware and software.

In the case of implementing by software, a computer readable storage medium or a computer program product storing one or more programs (software modules) may be provided. One or more programs stored in the computer readable storage medium or the computer program product are configured for execution by one or more processors in an electronic device. The one or more programs include instructions that cause the electronic device to execute the methods according to the claims of the disclosure or embodiments described in the description.

Such a program (software module or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs) or other types of optical storage devices, or a magnetic cassette. Further, the program may be stored in a memory composed of a combination of parts or the whole of them. Further, a plurality of memories may be included.

Further, the program may be stored in an attachable storage device that can be accessed through a communication network such as Internet, Intranet, local area network (LAN), wide LAN (WLAN), or storage area network (SAN) or a communication network composed of a combination thereof. The storage device may be accessed by a device that performs embodiments of the disclosure through an external port. Further, a separate storage device on the communication network may access a device that performs embodiments of the disclosure.

In the above-described detailed embodiments of the disclosure, the elements included in the disclosure may be expressed in the singular or plural form depending on the provided detailed embodiment. However, the singular or plural expression has been selected suitably for a situation provided for convenience of description, and the disclosure is not limited to the singular or plural elements. Although an element has been expressed in the plural form, it may be configured in the singular form. Although an element has been expressed in the singular form, it may be configured in the plural form.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a base station in a communication system, the method comprising:
    obtaining, from a terminal, state information;
    determining an active/sleep request indicator (ASRI) based on the state information, wherein the ASRI indicates one of an active state or a sleep state;
    transmitting, to a central unit, the state information and the ASRI;
    receiving, from the central unit, power control information determined based on the state information and the ASRI; and
    performing a power control based on the received power control information,
    wherein the power control information is used for controlling the base station to operate in one of the sleep state or the active state.

2. The method of claim 1, wherein the state information comprises at least one of channel state information with a terminal or a quality of service (QoS) indicator of the terminal.

3. The method of claim 1, wherein the ASRI indicates at least one of an active state, a sleep state, or a not decided state.

4. The method of claim 1, wherein, in case that the ASRI indicates the active state or the sleep state, the power control information is determined based on the ASRI.

5. The method of claim 3, wherein, in case that the ASRI indicates the not decided state, the power control information is determined based on the state information.

6. A method of a central unit in a communication system, comprising:
    receiving, from a base station, state information and an active/sleep request indicator (ASRI), wherein the ASRI indicates one of an active state or a sleep state;
    determining power control information for the base station based on the state information and the ASRI received from the base station; and
    transmitting the power control information to the base station,
    wherein the power control information is used for controlling the base station to operate in one of the sleep state or the active state.

7. The method of claim 6, wherein the state information comprises at least one of channel state information with a terminal or a quality of service (QoS) indicator of the terminal.

8. The method of claim 6, wherein the ASRI indicates at least one of an active state, a sleep state, or a not decided state.

9. The method of claim 6, wherein, in case that the ASRI indicates the active state or the sleep state, the power control information is determined based on the ASRI.

10. The method of claim 8, wherein, in case that the ASRI indicates the not decided state, the power control information is determined based on the state information.

11. A base station of a communication system, the base station comprising:
   a transceiver; and
   a controller operably connected to the transceiver, the controller configured to:
      obtain, from a terminal, state information,
      determine an active/sleep request indicator (ASRI) based on the state information, wherein the ASRI indicates one of an active state or a sleep state,
      transmit, to a central unit, the state information and the ASRI,
      receive, from the central unit, power control information determined based on the state information and the ASRI, and
      perform a power control based on the received power control information,
   wherein the power control information is used for controlling the base station to operate in one of the sleep state or the active state.

12. The base station of claim 11, wherein the state information comprises at least one of channel state information with a terminal or a quality of service (QoS) indicator of the terminal.

13. The base station of claim 11, wherein the ASRI indicates at least one of an active state, a sleep state, or a not decided state.

14. The base station of claim 11, wherein, in case that the ASRI indicates the active state or the sleep state, the power control information is determined based on the ASRI.

15. The base station of claim 13, wherein, in case that the ASRI indicates the not decided state, the power control information is determined based on the state information.

16. A central unit in a communication system, the central unit comprising:
   a transceiver; and
   a controller operably connected to the transceiver, the controller configured to:
      receive, from a base station, state information and an active/sleep request indicator (ASRI), wherein the ASRI indicates one of an active state or a sleep state,
      determine power control information for the base station based on the state information and the ASRI received from the base station, and
      transmit the power control information to the base station,
   wherein the power control information is used for controlling the base station to operate in one of the sleep state or the active state.

17. The central unit of claim 16, wherein the state information comprises at least one of channel state information with a terminal or a quality of service (QoS) indicator of the terminal.

18. The central unit of claim 16, wherein the ASRI indicates at least one of an active state, a sleep state, or a not decided state.

19. The central unit of claim 16, wherein, in case that the ASRI indicates the active state or the sleep state, the power control information is determined based on the ASRI.

20. The central unit of claim 18, wherein, in case that the ASRI indicates the not decided state, the power control information is determined based on the state information.

* * * * *